United States Patent
Schempf (10) Patent No.: US 8,738,198 B2
(45) Date of Patent: May 27, 2014

(54) ROBOT SURVEILLANCE SYSTEM AND METHOD

(75) Inventor: Hagen Schempf, Pittsburgh, PA (US)

(73) Assignee: Foster-Miller, Inc., Waltham, MA (US)

( * ) Notice: Subject to any disclaimer, the term of this patent is extended or adjusted under 35 U.S.C. 154(b) by 34 days.

(21) Appl. No.: 13/134,009

(22) Filed: May 26, 2011

(65) Prior Publication Data

US 2012/0303179 A1  Nov. 29, 2012

(51) Int. Cl.
*G06F 17/00* (2006.01)
*B64C 39/02* (2006.01)

(52) U.S. Cl.
CPC .................. *B64C 39/022* (2013.01)
USPC ............................................. 701/2

(58) Field of Classification Search
CPC ...................................... B64C 39/022
USPC ............................................. 701/2
See application file for complete search history.

(56) References Cited

U.S. PATENT DOCUMENTS

| | | | | |
|---|---|---|---|---|
| 3,096,046 A | * | 7/1963 | Kendall, Jr. et al. | 244/17.13 |
| 3,149,803 A | * | 9/1964 | Petrides et al. | 244/17.13 |
| 3,217,097 A | * | 11/1965 | Pauli et al. | 348/144 |
| 3,241,145 A | * | 3/1966 | Petrides | 343/705 |
| 3,381,922 A | * | 5/1968 | Laing | 244/136 |
| 4,058,277 A | * | 11/1977 | Kozakiewicz et al. | 244/17.17 |
| 5,435,259 A | * | 7/1995 | Labrador | 114/39.31 |
| 6,119,976 A | | 9/2000 | Rogers | |
| 7,510,142 B2 | * | 3/2009 | Johnson | 244/17.17 |
| 7,766,274 B1 | | 8/2010 | Jameson et al. | |
| 2004/0167682 A1 | * | 8/2004 | Beck et al. | 701/3 |
| 2007/0198144 A1 | * | 8/2007 | Norris et al. | 701/23 |
| 2008/0245924 A1 | | 10/2008 | Arlton et al. | |
| 2009/0071281 A1 | | 3/2009 | Fisk et al. | |
| 2009/0266628 A1 | | 10/2009 | Schempf et al. | |
| 2010/0044499 A1 | | 2/2010 | Dragan et al. | |
| 2010/0108807 A1 | * | 5/2010 | Barrett et al. | 244/1 N |

OTHER PUBLICATIONS

Israel Aerospace Industries, Electric Tethered Observation Platform ("ETOP"), date Dec. 26, 2012; Jan. 31, 2013, (six (6) pages total).

\* cited by examiner

*Primary Examiner* — Mary Cheung
*Assistant Examiner* — Frederick Brushaber
(74) *Attorney, Agent, or Firm* — Iandiorio Teska & Coleman, LLP (57) ABSTRACT

A robot surveillance system includes a robot chassis, a drive subsystem for the chassis, a dock on the chassis, and a payout device associated with the chassis. A flying module is configured to be received in the dock and includes at least one rotor powered by a motor and a body portion including an imager. A tether is coupled to the payout device of the robot and to the flying module for allowing the flying module to climb out of the dock when powered to gain elevation for surveillance and imaging via the imager and for retracting the flying module to land on the robot and reside in the chassis dock after surveillance.

10 Claims, 9 Drawing Sheets

ROBOT SURVEILLANCE SYSTEM AND METHOD

FIELD OF THE INVENTION

The subject invention relates to remotely controlled maneuverable robots and aerial video systems.

BACKGROUND OF THE INVENTION

Various remotely controlled maneuverable robots typically controlled by an operator control unit have been proposed and are in service in a variety of configurations and for a variety of tasks. Many such robots have an arm with an end effector, some include weapons, and most have cameras for transmitting images to a viewer associated with the operator control unit. See U.S. Patent Application Publication Nos. 2009/0071281 and 2009/0266628 incorporated herein by this reference. Some robots are fairly autonomous.

Aerial video systems have also been proposed. The Draganflyer X6 (Draganfly Innovations, Inc.) can be equipped with cameras. See also U.S. Patent Application Publication Nos. 2010/0044499 and 2008/0245924 and U.S. Pat. No. 7,766,274 incorporated herein by this reference.

Various flying drones equipped with cameras are also known. See U.S. Pat. No. 6,119,976. Lockheed Martin's RQ-170 Sentinel is an example of an unmanned aerial vehicle. Key design constraints include maneuverability, autonomy, and endurance (flight time). The result is many unmanned vehicles are extremely complex and expensive. The same is true with respect to some aerial video systems such as the gMAV vehicle.

Some aerial video systems, although perhaps less expensive and simpler in design, cannot fly in adverse weather conditions, have limited endurance, little autonomy, and have a limited range. They can be difficult to control and difficult to precisely land.

Robots, on the other hand, have imaging devices such as sensors and cameras that are often very low to the ground such as within one to three feet of the ground thereby offering limited perspective (due to reduced elevation), a very limited look-ahead area to enable three-dimensional sensing and accurate map-building to allow for effective route planning. The operator of a robot may not be able to detect terrain challenges such as ditches, barricades, unscalable boulder fields, and the like, which can limit terrain understanding, enemy-locating capabilities and data-based motion pre-planning. The same is true with respect to unmanned maneuverable robots.

BRIEF SUMMARY OF THE INVENTION

In this invention, a remotely controlled mobile robot is equipped with a flying module including an imager such as a video camera and/or other electro-magnetic spectrum active/passive sensor(s). A tether connects the flying module to the robot. The robot includes a dock for the flying module and the robot is maneuverable to a location remote from the operator whereupon the flying module is powered and spooled out so that it climbs and gains elevations to provide surveillance images and terrain data. The result is a much longer and alternate sensor-view perspective in complete circumference, selectable and controllable when needed to provide better image- and/or terrain data to allow longer-range planning and terrain-identification for route planning that better suits mission goals such as target detection/monitoring, time to target, ease of passage, and the like. Such a system can be employed with a remotely controlled robot or a more complex robot exhibiting autonomous behavior. The system can be manufactured at fairly low costs especially when compared to the price of unmanned aerial vehicles and provides immediate data of value to ground-deployed troops without requiring the call-in or tasking or pre-planning for use of a UAV, which itself will have limited availability and endurance. Maneuverability and controllability are less of a concern because the flying module is tethered to the robot. It is therefore a fairly straightforward operation to precisely land the flying module on the robot chassis, whether this be done under teleoperation or autonomously.

The invention features a surveillance method comprising equipping a remotely controlled maneuverable robot with a flying module including an imager. A flying module is tethered to the robot via a winch located on the robot. The robot is maneuvered using an operator control unit. The operator control unit is used to provide commands to power the flying module and to operate the winch to allow the flying module to climb and gain altitude. Image data is acquired via the imager of the flying module. The operator control unit is then used to provide commands which operate the winch and reel in the flying module until it lands and docks on the robot. The autonomy control module may also control both the robot and the flying module based on image and world-data models build on the fly.

Typically, image data is transmitted to the robot via the tether, but may also be processed/transmitted locally to the flying module. And, image data from the robot can be transmitted to the operator control unit using the robot or flying module antenna(e).

A surveillance method in accordance with the invention also features equipping a maneuverable robot with a flying module including an imager, tethering a flying module to the robot via a winch located on the robot, maneuvering the robot, powering the flying module and operating the winch to allow the flying module to climb and gain altitude, positioning the flying module via heading and azimuth actuation, acquiring image data via the imager of the flying module, and operating the winch to reel in the flying module until it docks on the robot. In some embodiments, an operator control unit is used to provide commands which power the flying module, operate the winch, and maneuver the robot. Other embodiments may utilize one or more autonomy control modules on the robot and/or flying module to autonomously maneuver either or both the flying module or robot based on operator commands or terrain-based model imaging data from the robot and flying module imager(s).

A robot system in accordance with and embodiment of the invention features a chassis, a drive subsystem for the chassis, a dock on the chassis, and a payout device associated with the chassis. A flying module is configured to be received in the dock. The flying module includes at least one rotor powered by a motor, and a body portion including an imager.

A tether is coupled to the payout device of the robot and to the flying module for allowing the flying module to climb out of the dock when powered to gain elevation for surveillance via the imager and for retracting the flying module to land on the robot and reside in the chassis dock after surveillance. The tether may include electrical or optical conductors for transmitting image data obtained by the imager. The tether may also include electrical conductors for sending power and/or signals to the flying module which control the operation of the flying module.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
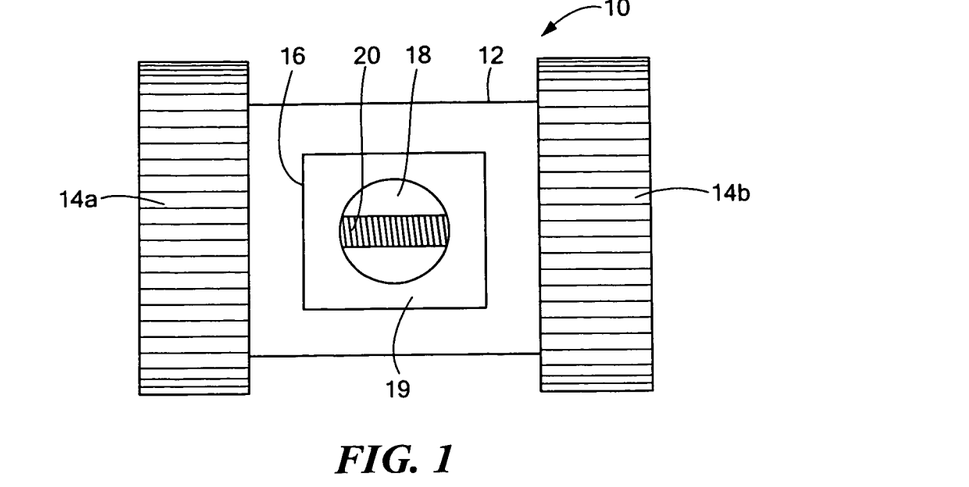
FIG. 1 is a schematic top view showing a robot chassis with a dock for a flying module in accordance with the invention.
Figure 2:
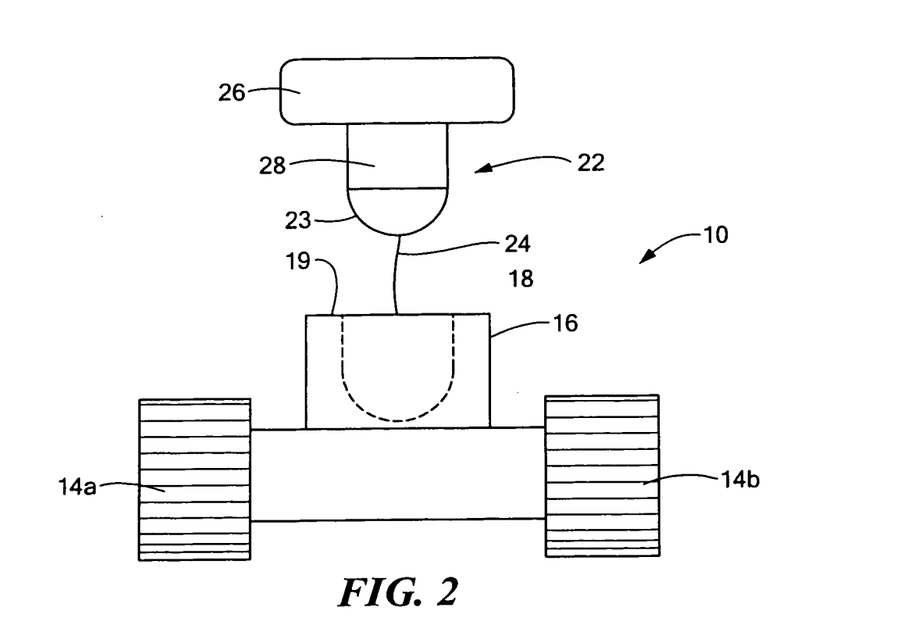
FIG. 2 is a schematic end view of a robot with a tether extending to a flying module in accordance with the invention.

FIGS. 1-2 depict robot 10 with chassis 12 and a drive subsystem including tracks 14a and 14b as disclosed in U.S. Patent Application Publication No. 2009/0071281. Wheels are also possible as disclosed in U.S. Patent Application Publication No. 2009/0266628. Still other robots include legs, flippers, and the like.

On robot chassis 12 is dock 16 which, in this particular example, includes a housing with chamber 18 therein open at the top of the housing. In FIG. 1, winch drum 20 can be seen at the bottom of chamber 18. FIG. 2 shows flying module 22 tethered to robot 10 via cable 24 wound about drum 20, FIG. 1.

Flying module 22 includes at least one rotor (e.g., a propeller) behind protective shroud 26 powered by a motor. Flying module 22 also includes body portion 28 including an imager such as video camera 23 or other passive/active electromagnetic spectrum sensing element(s). Preferably, dock 16 chamber 18 is configured to at least partially surround at least a portion of body 28 of flying module 22. In the design shown in the example of FIGS. 1-2, chamber 18 has an annular socket shape and body portion 28 of flying module 22 has the shape of a lengthy cylinder or bullet shape which fits in chamber 18 of dock 16. Shroud 26 rests on the top wall 19 of dock 16 surrounding the open top portion of chamber 18.

In operation, robot 10 is remotely maneuvered via an operator control unit and commands are wirelessly transmitted from the operator control unit to the robot, or though an on-board autonomy computer/sensory/hardware/software module. The operator control unit can be used to power up flying module 22 and run winch drum 20 to allow the flying module to climb and gain altitude as tether 24 pays out as shown in FIG. 2. Images of the surroundings and terrain are then acquired by the imager of the flying module 22 from elevations such as 100'. All the while, flying module 22 is tethered to robot chassis 12. Accordingly, flying module 22 need not be expensive or complicated in design and typically does not require autonomous operation; however autonomy on-board the robot and/or flying module can be used for ensuring the flying module maintains a certain position with respect of the robot (overhead, ahead by height z and offset x/y subject to sensed obstacles such as building, trees, winds, etc.). Tether 24 provides the height-control and data to the on-board motor(s) for thrust and heading/azimuth in controlling flying module 22 as opposed to radio signals from a separate operator control unit specific to flying module 22.

If flying module 22 is steerable or has controls for changing its pitch or heading or orientation, the operator control unit (or autonomy module) can be used to interface with these controls via robot 10.

Image data can be transmitted to robot 10 (via tether 24) which may include one or more conductors or cables and then wirelessly transmitted to the operator control unit. The tether could contain a high-bandwidth data-link (for video, etc.) allowing the computation and the transmission of the data to occur from and by the robot chassis. The same is true for the antenna. The antenna could be on the flying module and/or—it could also be on the robot (typically both). Data generated by the flying module and/or robot is used to plan a route either for display to the operator for teleoperated control, or is used by an autonomy module to drive the vehicle and the flying module automatically. Images transmitted from the flying module can also be used to control and maneuver the robot.

The spooled out flying module may be capable of sustained hovering and able to be repositioned and maneuvered while carrying a three-dimensional imaging sensor-suite, such as a stereo-camera or laser to provide terrain data to allow look-ahead three-dimensional modeling based on terrain geometry (3D and stereo-map, and the like) and type (color) and the like. Power and data links are available through the tether and the flying module need not carry its own power in some designs. Hovering and maneuvering may be accomplished through simple counter-rotating propellers while simple roll and pitch actuation can allow for repositioning tether tensioning, lateral viewing, offset flying/positioning, and the like.

The system is able to be rapidly deployed and retracted to provide aerial look-ahead views of the terrain. Mono and binocular stereo imaging and/or other electromagnetic spectrum sensor(s) may be used to provide terrain-modeling and classification and also provide an extremely valuable extension in interaction time constant for supervisory teleoperation and autonomy tasks due to its highly extended look-ahead field of view. The imager associated with the flying module can provide larger-area (courser resolution) aerial three-dimensional maps enabling for faster and more effective larger-area look-ahead mapping and route planning thereby enhancing any higher resolution localized maps generated by imaging devices associated with the robot itself. The higher resolution shorter range based maps and the lower resolution/longer range maps can be merged to feed a route planner controller that is programmed to take many constraints (traversability, terrain-type, energy, allotted time, enemy fire positions, and the like) into consideration. Such mapping extensions are able to enhance traverse speeds by providing better and earlier look-ahead route plans to meet traversability and locomotion constraints inherent to the robot platform primary in the case of an unmanned autonomous robot.

The flying module can also be deployed into urban structures allowing them to peer up staircases, for example, around corners, and into rooms without exposing personnel nor the robot to capture and/or destruction or damage. A similar system could be used in natural disaster scenarios, whether earthquakes, floods or fires, to perform larger-area assessment and search-and-rescue.

After the images are transmitted and processed, or (pre-)processed locally and then transmitted over the winch drum 20, FIG. 1 is wound the opposite direction under the control of the operator control unit (or the utonomy control module) to reel in flying module 22 until it securely docks in dock 16. Landing of the flying module on the robot is therefore a fairly straightforward operation. Tether 24 also retains flying module 22 securely in dock 16. The flying module is then powered down and robot 10 can be further maneuvered. In other designs, the winch is associated with the flying module.

Figure 3:
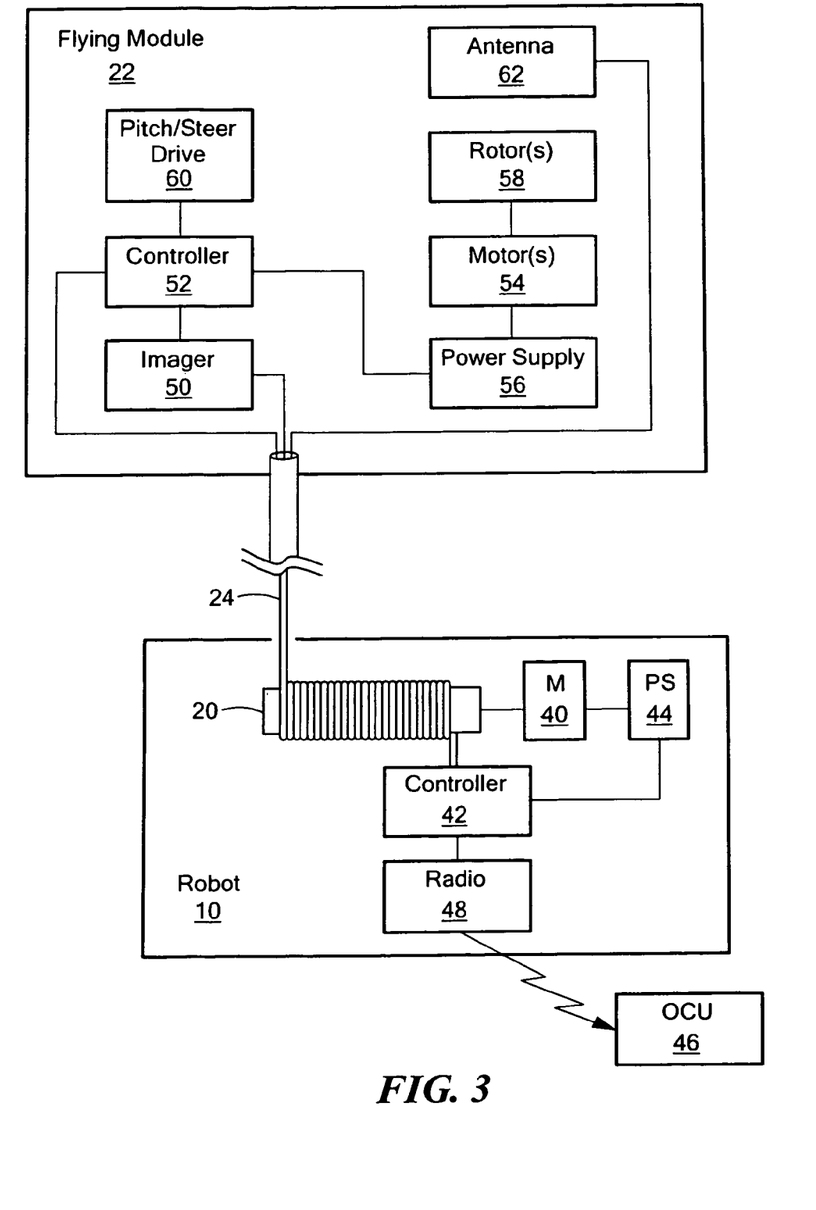
FIG. 3 is a block diagram depicting several of the primary components associated with both a robot and a flying module in accordance with the invention.

FIG. 3 shows robot 10 with winch drum 20 powered by motor 40 under the control of controlling electronic subsystem 42 (e.g., one or more microprocessors or the like) and power supply 44 (e.g., a battery). Operator control unit 46 in this particular example wirelessly interfaces with robot 10 via radio set 48 to receive commands interpreted by controller 42. Such commands include spooling tether 24 in and out, providing power to flying module 22 via tether 24, and the like.

Flying module 22 includes imager 50 (one or more cameras, video cameras, stereo imaging sensors, a hemispherical 360° field of view camera, and/or other electromagnetic passive active sensing elements and the like) providing image data directly or indirectly via controller 52, for example, to robot 10 controlling electronics 42 via conductors or cabling in tether 24. These images can then be transmitted via controlling electronics 42 and radio 48 to operator control unit 46 if desired. Controlling electronics 42 can also use the image data, in some designs, to perform terrain modeling and classification and in connection with route planning electronics as discussed above onboard the robot.

Operator control unit 46 may also provide commands to robot controlling electronics 42 via radio 48 for providing power to flying module 22. Controlling electronics 42 interprets these commands and provides commands via one or more conductors in tether 24 to controlling electronics 52 of flying module 52 which provides the appropriate signals to motor 54 and power supply 56 to rotate one or more of the rotors or propeller(s) 58. There may be more than one propeller or rotor and various or multiple motors. Alternatively, power for the flying module rotors may be provided from robot 10 via tether 24. Robot 10 typically includes one or more batteries.

If flying module 22 includes pitch and/or steering or other maneuvering drive 60, controller 50 can control those drives again based on commands provided by operator control unit 46 to robot 10 and then to controller 52 via tether 24. Antenna 62 may also be provided and signals output and received by antenna 62 may be routed via tether 24 to controlling electronics 42 of robot 10. Commands for controlling the robot and/or flying module can be received by antenna 62. Also, antenna 62 can be used to transmit data such as image or other data. In the case of a robot which is more autonomous in design, operator control unit 46 may not be needed and commands for spooling out the tether and controlling the flying module may come from the controlling electronics of the robot or the flying module itself.

Tether 24 provides both the mechanical coupling between flying module 22 and robot 10 and functions to supply electronic signals and/or power between robot 10 and flying module 22. As a mechanical coupling between flying module 22 and robot 10, tether 24 controls the elevation of flying module 22 and keeps the flying module in control even in adverse weather conditions. Tether 24 also locks flying module 22 in dock 16, FIGS. 1-2 when flying module 22 is not deployed and when robot 10 maneuvers. Tether 24 also provides for accurate landing of flying module 22 on robot 10. Conventional aerial video systems (except for high-altitude dirigibles and/or balloons) are not designed to be tethered to anything and require their own independent hand held control unit.

Figure 4:
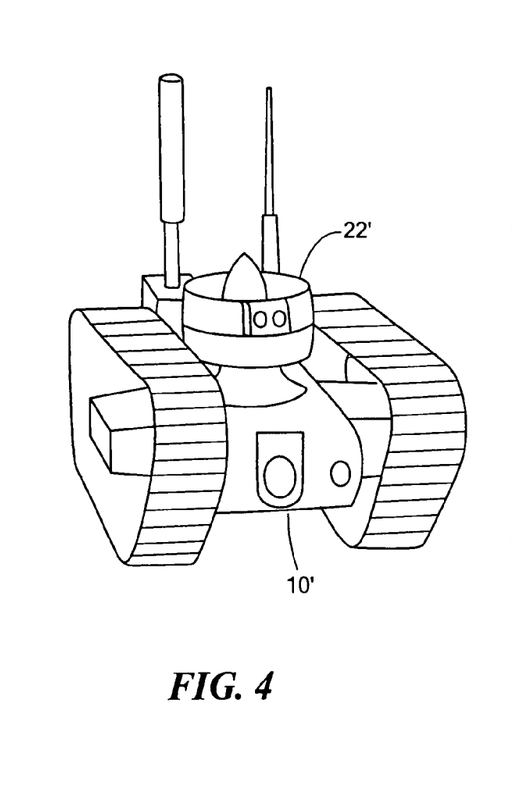
FIG. 4 is a schematic three-dimensional front view showing an example of a robot with a flying module coupled thereto in a stowed position.
Figure 5:
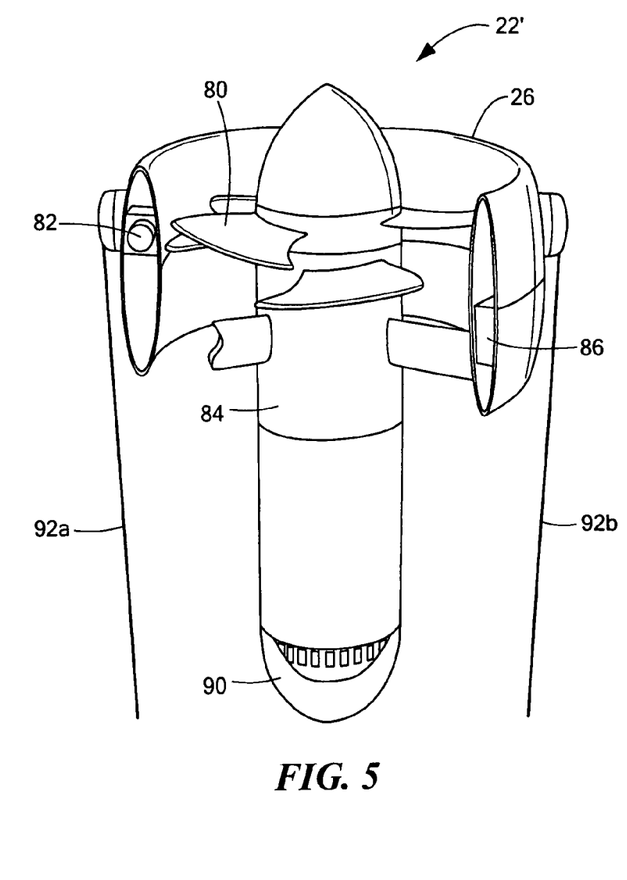
FIG. 5 is a schematic three-dimensional partially cut away view of a version of a flying module in accordance with the subject invention.
Figure 6:
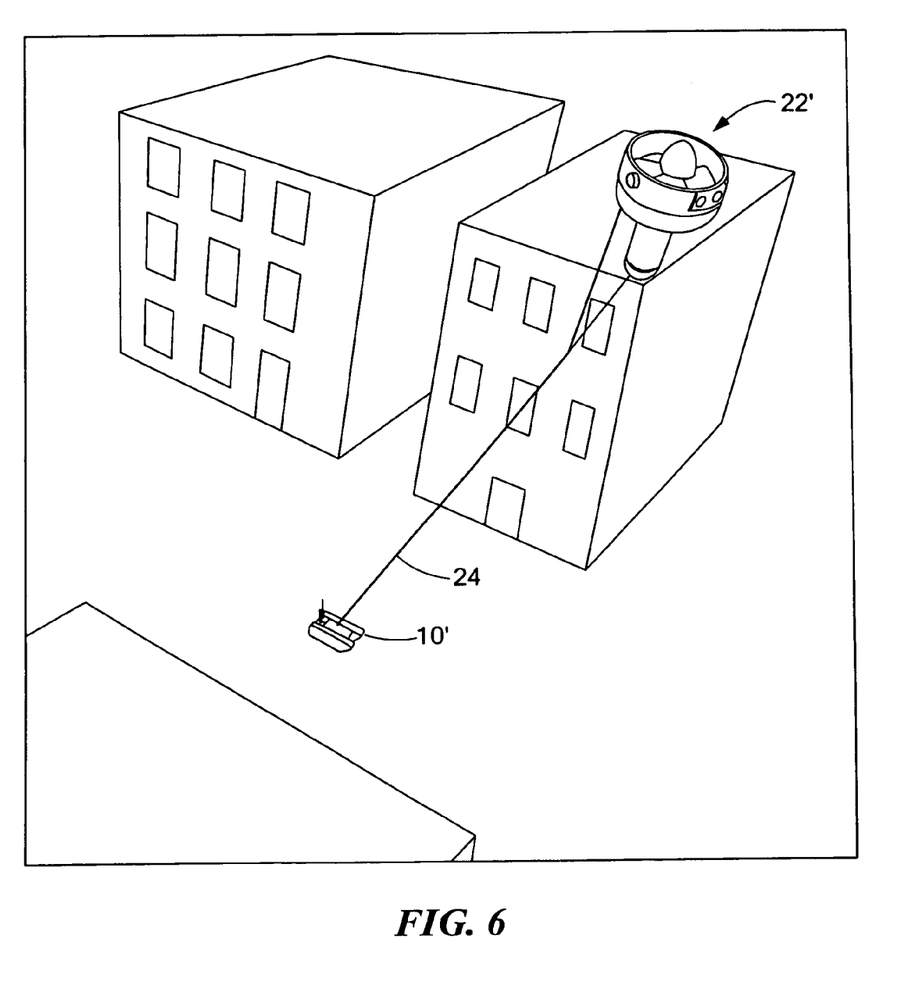
FIG. 6 is a schematic three-dimensional view showing a flying module in its deployed configuration.

FIG. 4 depicts robot 10' with flying module 22' docked thereon. In this particular version, flying module 22', FIG. 5 includes dual ducted prop 80, steer and pitch drive 82, motor section 84, heading and roll drive 86, controlling electronics section 88, and hemispherical 360° field of view camera (or any such electromagnetic spectrum sensor) 90. Actuator 82 provides for rotation and tilt of the shroud with respect to the tether to allow the flying module to be able to control heading and azimuth for better maneuvering. Dual power and data tethers 92a and 92b are used. A stereo imaging sensor subsystem may be provided on shroud 26. FIG. 6 shows flying module 22' at elevation as tethers 92a and 92b are paid out.

Figure 7:
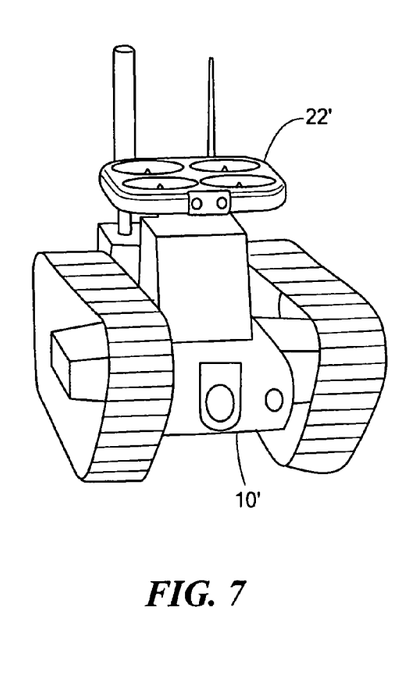
FIG. 7 is a schematic three-dimensional front view showing another example of a robot and flying module in accordance with the invention.
Figure 8:
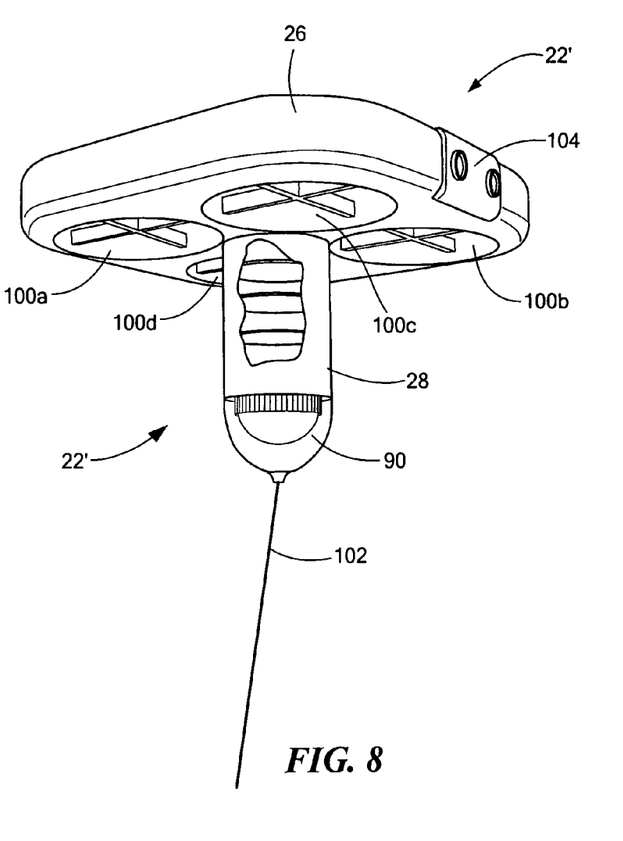
FIG. 8 is a schematic three-dimensional view showing in more detail the flying module of FIG. 7.
Figure 9:
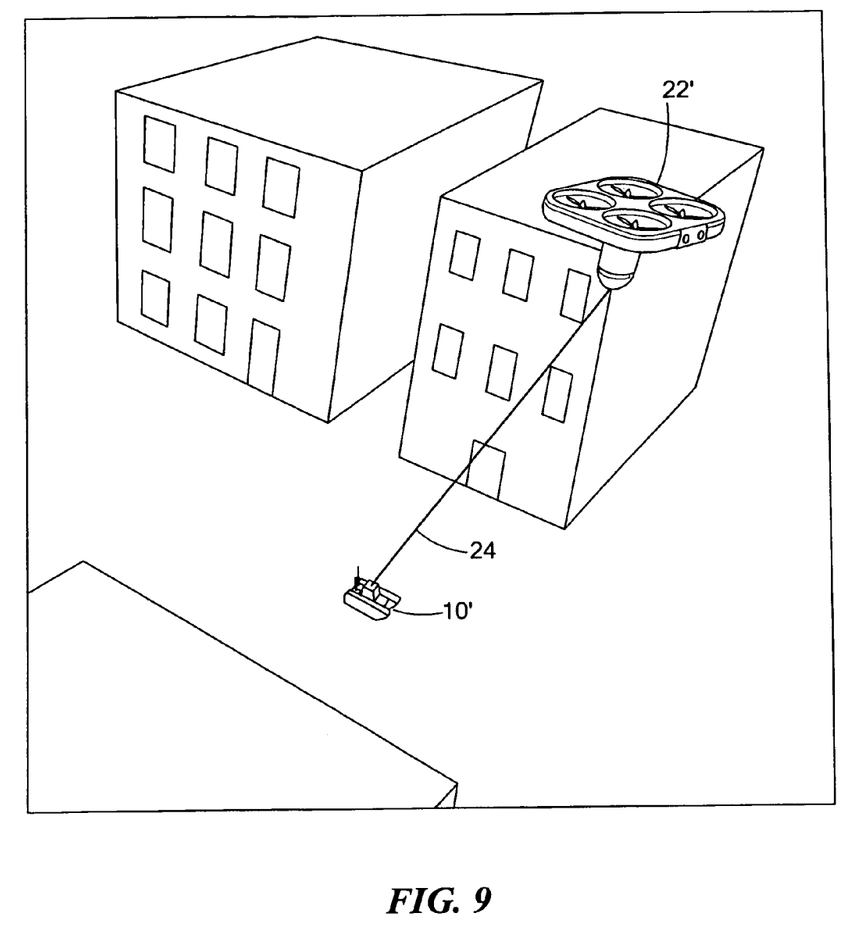
FIG. 9 is a schematic three-dimensional view showing the flying module of FIG. 7 in its deployed position.

FIGS. 7-9 depict a flying module 22" which in this particular design has (up to) four propellers 100a-100d and single tether 102. A stereo imaging sensor subsystem is shown at 104 on shroud 26.

In this way, the expense and complexity of unmanned aerial vehicles is avoided and at the same time the limitations associated with conventional aerial video systems are addressed and yet the system of the invention is able to provide adequate surveillance and enhanced mapping and route planning functionality.

Figure 10A:
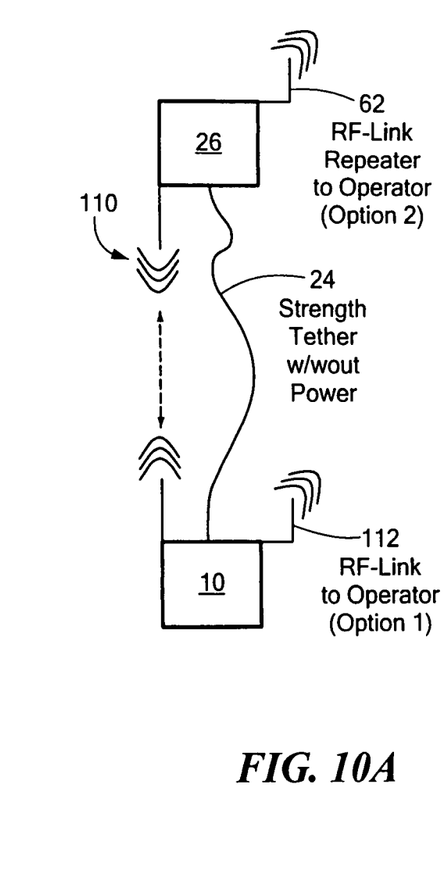
FIG. 10A is a schematic block diagram showing an embodiment of the subject invention where the tether mechanically couples the mobile robot to the flying module and optionally provides power to the flying module.
Figure 10B:
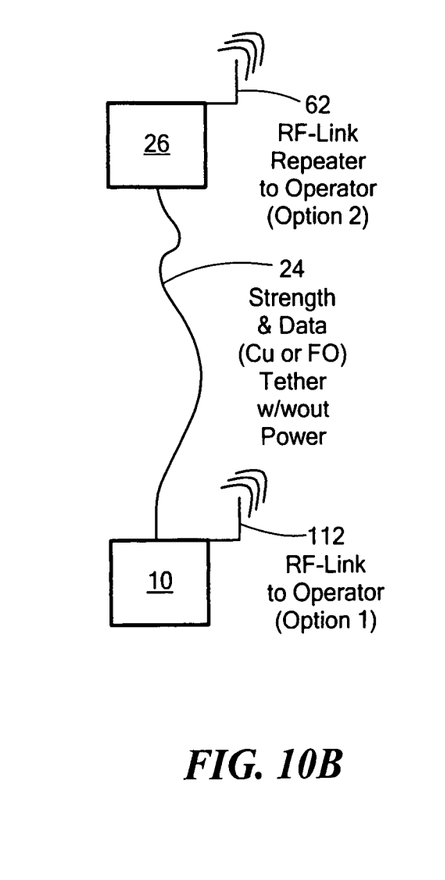
FIG. 10B is a schematic block diagram showing an embodiment of the subject invention where the tether between the mobile robot and the flying module mechanically couples the flying module to the mobile robot and also provides data between the mobile robot and the flying module and also optionally provides power to the flying module.
Figure 10C:
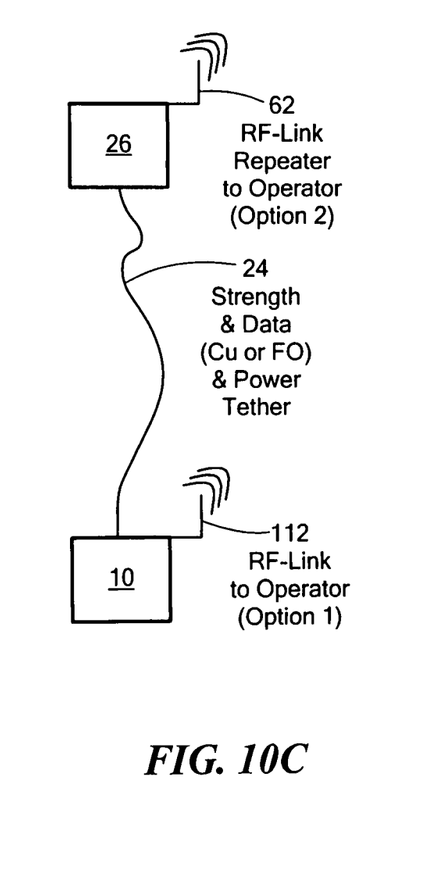
FIG. 10C is a schematic block diagram showing a tether between the mobile robot and the flying module which mechanically couples the flying module to the mobile robot, provides data between the mobile robot and the flying module, and provides power to the flying module.

FIG. 10A shows an embodiment where mobile robot 10 is mechanically coupled to flying module 26 via tether 24 and wherein tether 24 is primarily designed to mechanically couple flying module 26 to mobile robot 10. Optionally, power may be transmitted via tether 24 from mobile robot 10 to flying module 26. Data between mobile robot 10 and flying module 26 can be provided by a short range RF or optical data link as shown at 110. Alternatively, if flying module 26 has autonomous capabilities, the need for a short range RF or an optical data link between flying module 26 and mobile robot 10 may not be needed. In the case where power is not provided to flying module 26 via tether 24, then flying module 26 would likely include onboard rechargeable batteries that can be recharged in the mobile robot dock. Also note that the antenna of flying module 26 as shown at 62 can be used for an RF link repeater to the operator and/or antenna 112 on mobile robot 10 can be used as an RF link to the operator. Or, they both may be used simultaneously as a disparity pair wherein a controller picks the best antenna based on received signal strength. FIG. 10B shows an embodiment where tether 24 is used both as a mechanical coupling between flying module 26 and mobile robot 10 and also as a data transmission path. If power is not transmitted via tether 24 then, as explained above, batteries would likely be included in flying module 26 and recharged in the dock of robot 10. FIG. 10C shows an embodiment where tether 24 provides mechanical coupling between robot 10 and flying module 26, a data transfer path, and power for flying module 26.

Figure 11A:
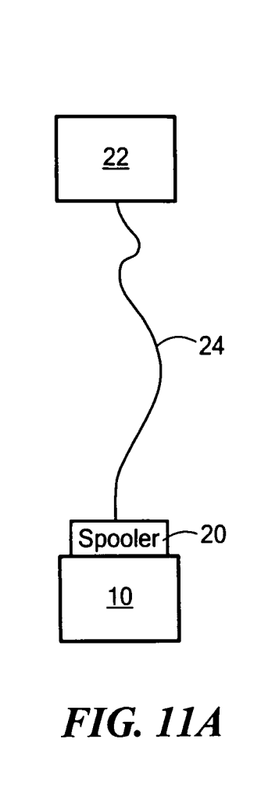
FIG. 11A is a schematic block diagram showing a tether spooler or winch associated with a mobile robot.
Figure 11B:
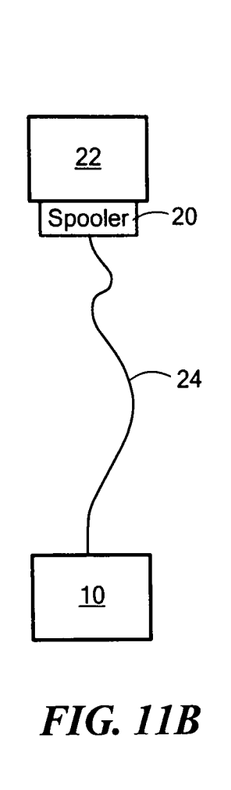
FIG. 11B shows an embodiment where the spooler or winch is associated with the flying module.
Figure 12A:
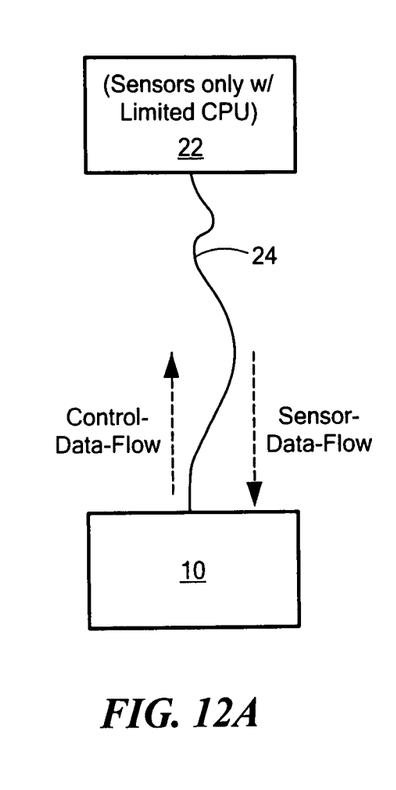
FIG. 12A is a schematic block diagram showing one embodiment in accordance with the subject invention where control data and sensor data are transmitted between the flying module and the mobile robot via the tether.

FIG. 11 shows an example as discussed previously where mobile robot 10 includes spooler or a winch 20. FIG. 12A shows an embodiment where tether 24 includes fiber optic capabilities which transmit high bandwidth real time digitized video signals from flying module 22 to mobile robot 10. Mobile robot 10, in turn, transmits control and data to flying module 22. Communications, flying module command, and sensor/data processing primarily takes place on mobile robot 10 which has one or more higher power CPUs. In this example, flying module 22 has sensors and only limited processing capabilities.

Figure 12B:
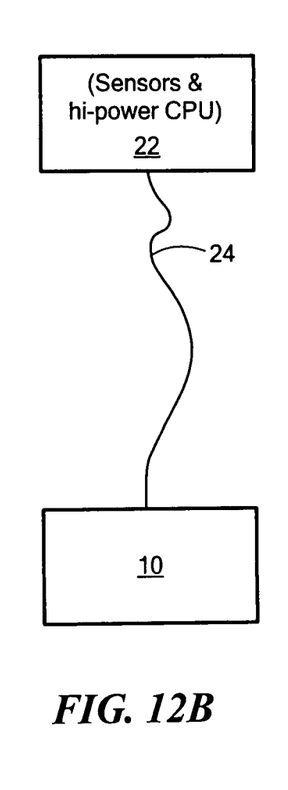
FIG. 12B is a schematic block diagram showing an embodiment where the flying module and/or the mobile robot are more autonomous in configuration.

In FIG. 12B, in contrast, flying module 22 has higher central processing capabilities and, in this case, tether 24 is typically only included to mechanically couple flying module 22 to mobile robot 10. Flying module 22 has sensor and data processing capabilities and command generation capabilities. In this sense, flying module 22 is more autonomous. In the simplest environment, the operator remotely drives the mobile robot and also provides the command which flies the flying module. In a more complex embodiment, the operator may need to initiate the operation of the flying module and while the operator controls the mobile robot, the flying module flies itself. In another more complex embodiment, the operator only initiates the operation of the flying module and the mobile robot follows the flying module.

Figure 13:
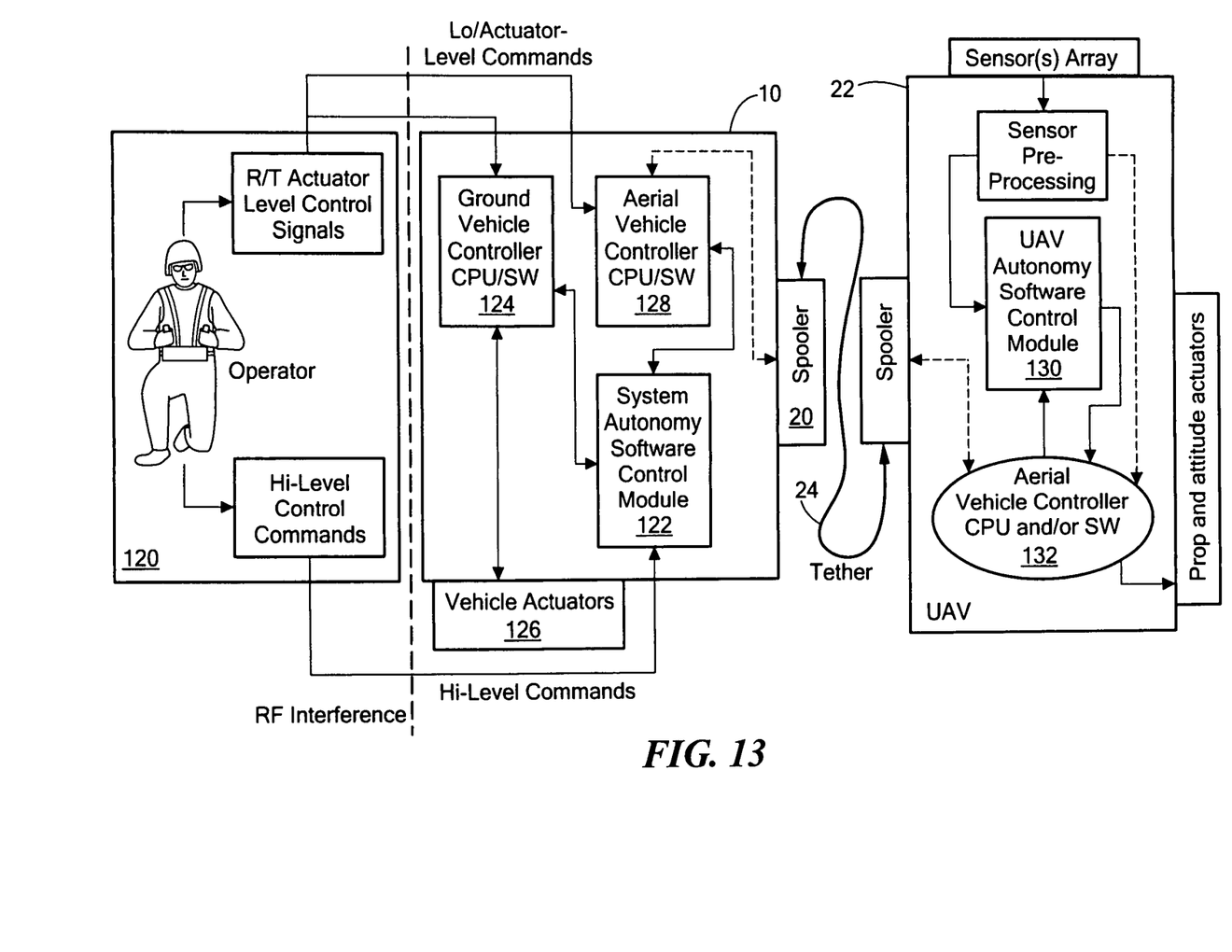
FIG. 13 is a block diagram showing the primary components associated with a more autonomous system in accordance with the subject invention.

FIG. 13 shows the primary components associated with a more autonomous system where operator 120 provides high level control commands (typically via an operator control unit) to system autonomy software control module 122 on mobile robot 10. Actuator level control signals are provided to vehicle controller 124 which operates vehicle actuators 126. System autonomy software control module 122 also interfaces with aerial vehicle controller 128. As discussed above, it is possible that flying module 22 also includes an autonomy software control module 130 which processes data transmitted by the sensors associated with flying module 22 and also data supplied by flying module controller 132. System autonomy software control module 122 of mobile robot 10 can be configured to make mobile robot and flying module decisions. Vehicle controller 132 in flying module 122 performs these commands. Autonomy software control module 130 associated with flying module 122 can be configured to signal vehicle controller 132 in order to follow mobile robot 10, detect targets and track the same, provide for automated hovering and flight path generation and tracking, video based target tracking and the like. Autonomy software control module 130 may be configured to provide functionality for automated docking and release and climbing behaviors; automated obstacle avoidance; automated window look in positioning and hovering capabilities; three-dimensional model building; target and/or friend/foe illumination and/or detecting and tracking; higher floor, sniper detection, triangulation and monitoring; and the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A robot system comprising:
   a robot including:
      a chassis,
      a drive subsystem for maneuvering the robot chassis,
      a dock on the chassis,
      a payout device associated with the dock including a tether, and
      a radio subsystem;
   a flying module connected to the tether configured to be received in the dock and including:
      at least one rotor,
      an imager, and
      an antenna; and
   an operator control unit which wirelessly controls the robot drive subsystem to maneuver the robot chassis and controls the payout device and flying module to deploy and dock the flying module via wireless transmissions to the robot radio subsystem and via wireless transmissions to the flying module antenna.

2. The robot system of claim 1 in which the imager is configured to provide images to the robot via the tether.

3. The robot system of claim 1 in which the robot includes a controller responsive to the radio subsystem and configured to control the payout device and the flying module.

4. The robot system of claim 3 in which operator control unit commands for controlling at least one of the robot and flying module received by the flying module antenna are routed to the robot controller.

5. The robot system of claim 1 in which power to the flying module is provided from the robot to the flying module via the tether.

6. The robot system of claim 1 in which at least one of the robot and flying module includes one or more autonomy software control modules.

7. The robot system of claim 1 in which the tether includes electrical conductors for transmitting image data obtained by the imager of the flying module to the robot.

8. A method of controlling a remotely controlled robot and a flying module tethered to the remotely controlled robot via a payout device, the method comprising:
    using an operator control unit to maneuver the remotely controlled robot via commands provided to the remotely controlled robot;
    using the operator control unit to control the payout device via commands provided to the remotely controlled robot;
    using the operator control unit to power on and deploy the flying module via commands provided to the remotely controlled robot;
    using the operator control unit to maneuver the remotely controlled robot via commands provided to the flying module when deployed via an antenna on the flying module;
    using the operator control unit to control the payout device via commands provided to the flying module via said antenna; and
    using the operator control unit to control the flying module via commands provided to the flying module when deployed via said antenna.

9. The method of claim 8 further including obtaining images via an imager on the flying module and transmitting said images to the robot via the tether.

10. The method of claim 9 further including transmitting said images from the robot to the operator control unit.

* * * * *